US009971545B1

(12) United States Patent
Asnaashari

(10) Patent No.: US 9,971,545 B1
(45) Date of Patent: May 15, 2018

(54) NON-VOLATILE WRITE AND READ CACHE FOR STORAGE MEDIA

(71) Applicant: Crossbar, Inc., Santa Clara, CA (US)

(72) Inventor: Mehdi Asnaashari, Danville, CA (US)

(73) Assignee: CROSSBAR, INC., Santa Clara, CA (US)

( * ) Notice: Subject to any disclaimer, the term of this patent is extended or adjusted under 35 U.S.C. 154(b) by 91 days.

(21) Appl. No.: 15/078,487

(22) Filed: Mar. 23, 2016

(51) Int. Cl.
*G06F 3/06* (2006.01)

(52) U.S. Cl.
CPC ............ *G06F 3/0656* (2013.01); *G06F 3/061* (2013.01); *G06F 3/068* (2013.01); *G06F 3/0616* (2013.01); *G06F 3/0626* (2013.01); *G06F 3/0635* (2013.01); *G06F 3/0659* (2013.01); *G06F 3/0676* (2013.01)

(58) Field of Classification Search
None
See application file for complete search history.

(56) References Cited

U.S. PATENT DOCUMENTS

| 6,295,577 | B1 | 9/2001 | Anderson et al. |
| 7,800,856 | B1 | 9/2010 | Bennett et al. |
| 9,170,939 | B1* | 10/2015 | Jones ............... G06F 12/0246 |
| 2014/0082276 | A1* | 3/2014 | Suzuki ............... G06F 12/0866 711/113 |
| 2016/0132237 | A1* | 5/2016 | Jeong ............... G06F 3/061 711/103 |
| 2016/0291887 | A1* | 10/2016 | Gole ............... G06F 3/064 |
| 2017/0068456 | A1* | 3/2017 | Toge ............... G06F 3/0605 |
| 2017/0068488 | A1* | 3/2017 | Shibatani ............... G06F 3/0656 |
| 2017/0123722 | A1* | 5/2017 | Sela ............... G06F 3/0656 |

* cited by examiner

*Primary Examiner* — John A Lane
(74) *Attorney, Agent, or Firm* — Amin, Turocy & Watson, LLP

(57) ABSTRACT

Providing for a non-volatile buffer for a data storage device is disclosed herein. By way of example, the non-volatile buffer can save data that is to be written to a high-capacity data storage device. By utilizing non-volatile memory for the buffer, write caching operations can be streamlined, allowing a host to de-allocate memory more quickly as compared with volatile buffer memory, while reducing or avoiding hardware (e.g., capacitors) utilized to provide temporary power to volatile memory. In one example, the non-volatile buffer can comprise two-terminal, resistive switching memory having high read and write performance. Such a buffer can facilitate caching operations at speeds suitable for modern high-capacity storage devices.

20 Claims, 11 Drawing Sheets

NON-VOLATILE WRITE AND READ CACHE FOR STORAGE MEDIA

INCORPORATION BY REFERENCE

The present application for patent hereby incorporates by reference herein in their respective entireties and for all purposes the following: U.S. patent application Ser. No. 14/749,947 filed Jun. 25, 2015, U.S. patent application Ser. No. 14/750,740 filed Jun. 25, 2015, U.S. patent application Ser. No. 14/750,293 filed Jun. 25, 2015, U.S. patent application Ser. No. 11/875,541 filed Oct. 19, 2007, U.S. patent application Ser. No. 12/575,921 filed Oct. 8, 2009 and U.S. patent application Ser. No. 14/588,185 filed Dec. 31, 2014.

TECHNICAL FIELD

The subject disclosure relates generally to resistive switching memory, and as one illustrative example, programmable, high-speed logic applications utilizing an array(s) of non-volatile resistive switching memory devices.

BACKGROUND

The inventor(s) of the present disclosure has proposed models of two-terminal memory devices that he expects to operate as viable alternatives to various memory cell technologies, such as metal-oxide semiconductor (MOS) type memory cells employed for electronic storage of digital information. Models of memory cells using two-terminal memory such as resistive-switching memory devices among others, are believed by the inventor(s) to provide some potential advantages over purely non-volatile FLASH MOS type transistors, including smaller die size, higher memory density, faster switching (e.g., from active to de-active, or vice versa), good data reliability, low manufacturing cost, fab-compatible processes, and other advantages, for example.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Various embodiments of the present disclosure provide a non-volatile buffer for a data storage device. The non-volatile buffer can be employed to save data that is to be written to a high-capacity data storage device, such as a disc or disk drive, tape drive, or other suitable high-capacity data storage device. By utilizing non-volatile memory for the buffer, write caching operations can be streamlined, allowing a host to de-allocate memory more quickly as compared with volatile buffer memory. Alternatively, or in addition, hardware utilized to provide temporary power to volatile memory can be avoided, reducing fabrication cost and simplifying the data storage device. In further embodiments, the non-volatile buffer can comprise two-terminal, resistive switching memory having high read and write performance. The high read/write performance of resistive switching memory can facilitate caching operations at speeds suitable for modern high-capacity storage devices.

In an embodiment, there is disclosed an electronic apparatus. The electronic apparatus can comprise a hard drive, a caching buffer comprising non-volatile solid state memory and a controller. The controller can comprise a memory for storing instructions related to writing data to a hard drive by way of the caching buffer, and a processor for implementing the instructions. In various embodiments, the controller can further comprise a host interface configured to facilitate communication between a host device and the controller and a hard drive interface configured to facilitate communication between the hard drive and the controller. Moreover, the controller can comprise a buffer interface configured to facilitate communication between the caching buffer and the controller. In various embodiments, the controller can be configured to receive an instruction to store a set of data at the hard drive, and to write the set of data to the caching buffer in response to the instruction. Furthermore, the caching buffer can be configured to send a command complete response to the controller in response to receiving the set of data.

In further embodiments, the subject disclosure provides a memory controller. The memory controller can comprise a host interface configured to facilitate communication between a host device and the memory controller and a hard drive interface configured to facilitate communication between the hard drive and the memory controller. Additionally, the memory controller can comprise a buffer interface configured to facilitate communication between a non-volatile solid state memory device and the memory controller and a memory module configured to store instructions related to operations of the memory controller. Moreover, the memory controller can comprise a processor configured to execute the instructions to facilitate implementing the operations, wherein the instructions comprise: receiving a command over the host interface to store data at the hard drive, writing the data over the buffer interface to a buffer comprising the non-volatile solid state memory device in response to receiving the command and replying to the command over the host interface with a command complete acknowledgment in response to writing the data to the buffer.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Figure 1:
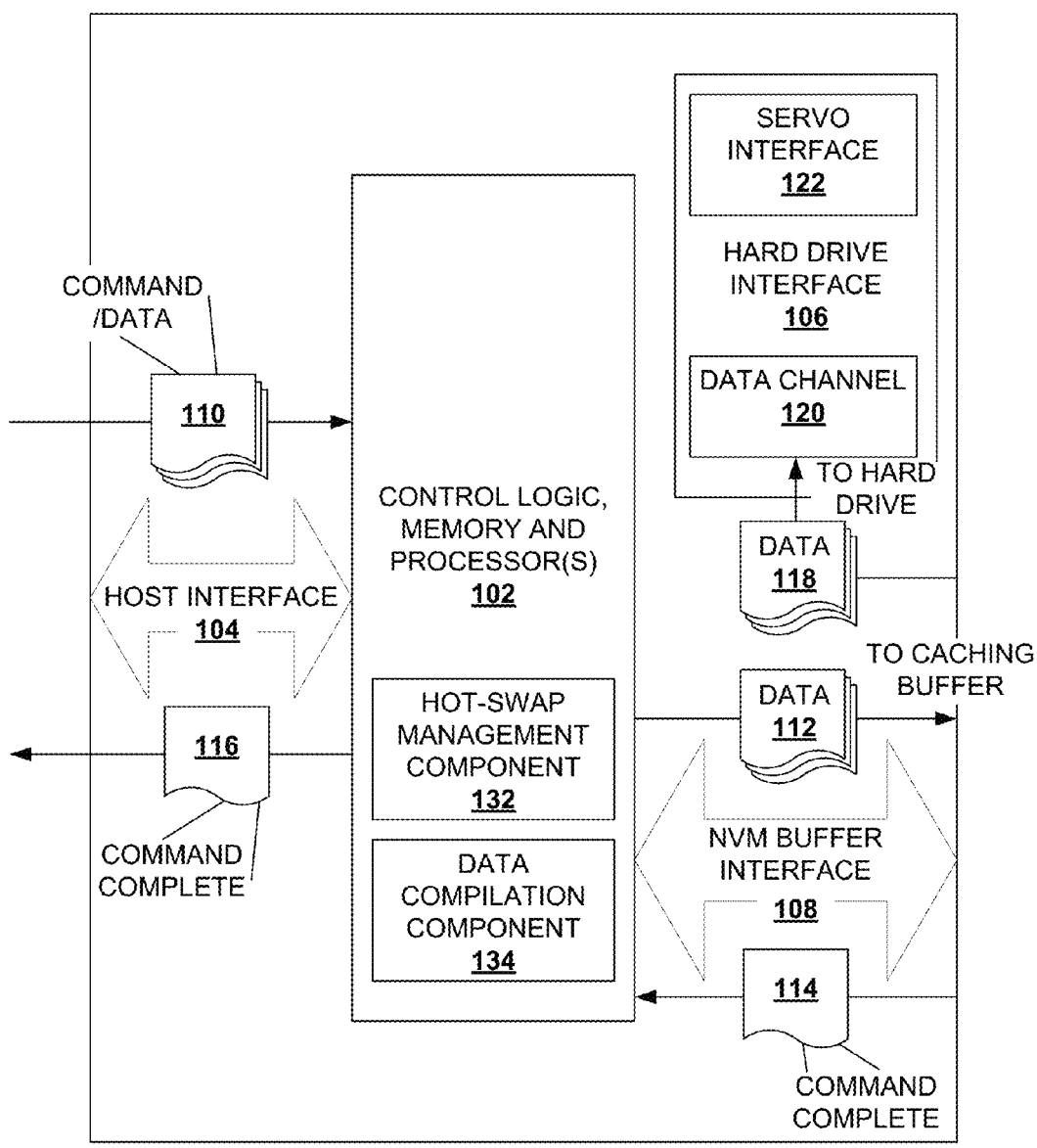
FIG. 1 depicts a block diagram of an example memory controller operable in conjunction with a non-volatile caching buffer, in various embodiments.

The subject disclosure relates to a data storage device comprising a non-volatile buffer and a memory controller configured to utilize the non-volatile buffer as a cache memory, in various embodiments. The non-volatile buffer can utilize two terminal memories to achieve high performance. By utilizing a non-volatile buffer, the storage device can emulate much larger speeds than otherwise achievable by the native hard drive media employed by the storage device. For instance, the storage device can acknowledge a write command once data associated with the write command is written to the non-volatile buffer. Because two terminal memories are expected to write data hundreds or thousands of times faster than a hard drive, a host device issuing the write command receives the acknowledgment much more quickly than with a conventional device. In response to the acknowledgment, the host device can de-allocate memory reserved for the data, and utilize that memory for other purposes. Accordingly, the data storage device can facilitate improved efficiency for an associated host device. In one or more additional embodiments, read/write head optimization can be implemented to further improve performance and reduce power consumption of the data storage device when storing data to the hard drive media. In other embodiments, the non-volatile buffer can be a removable memory device, and the memory controller can employ hot-swap protocols or circuitry to detect connectivity of the non-volatile buffer before implementing caching operations for the hard drive media. By utilizing removable memory for the non-volatile buffer, longevity of the data storage device can be extended beyond the life of the resistive switching memory. Further, the buffer can be replaced with newer or upgraded memory, among other benefits.

Referring more generally to the disclosed embodiments, two-terminal memory cells can include a resistive technology, such as a resistive-switching two-terminal memory cell. Resistive-switching two-terminal memory cells (also referred to as resistive-switching memory cells or resistive-switching memory), as utilized herein, comprise circuit components having a pair of conductive contacts with an active region between the conductive contacts. The active region of the two-terminal memory device, in the context of resistive-switching memory, exhibits a plurality of stable or semi-stable resistive states, each resistive state having a distinct electrical resistance. Moreover, respective ones of the plurality of states can be formed or activated in response to a suitable electrical signal applied at the conductive contacts. These electrical signals can be selected to have suitable characteristics, such as a voltage or current value, a voltage or current polarity, a field strength, a field polarity, or the like, or a suitable combination thereof. Examples of a resistive switching two-terminal memory device, though not exhaustive, can include a resistive random access memory (RRAM), a phase change RAM (PCRAM) and a magnetic RAM (MRAM).

Resistive switching memory described in the subject disclosure can include filamentary-based devices, in various embodiments, including, e.g., a non-volatile memory device, a volatile selector device, a combination of the foregoing, or a similar device. Composition of filamentary-based devices can vary per device, with different components selected to achieve desired characteristics (e.g., volatility/non-volatility, on/off current ratio, switching time, read time, memory durability, program/erase cycle, and so on). One example of a filamentary-based device can comprise: a conductive layer, e.g., metal, doped p-type (or n-type) silicon (Si) bearing layer (e.g., a p-type or n-type Si bearing layer, p-type or n-type polysilicon, p-type or n-type polycrystalline SiGe, etc.), a resistive switching layer (RSL) and an active metal layer capable of being ionized. Under suitable conditions, the active metal layer can provide filament-forming ions to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer.

The conductive filament can be non-volatile (e.g., for a memory device) or volatile (e.g., for a selector device utilized to activate or deactivate the memory device) depending on characteristics of the filamentary-based device. Examples of characteristics that can contribute to volatility/non-volatility can include a material employed for the RSL, a density of particle-trapping defects within the RSL, surface energy of filament-forming particles, conductivity of the device when the conductive filament is formed vis-à-vis current compliance settings (if any) employed for activation/programming, thickness (and associated mechanical stability) of the conductive filament, thin-ness (and associated mechanical instability) of the conductive filament, or other suitable factors, or suitable combinations of the foregoing.

A RSL (which can also be referred to in the art as a resistive switching media (RSM)) can comprise, e.g., an undoped amorphous Si layer, a semiconductor layer having intrinsic characteristics, a Si sub-oxide (e.g., SiOx wherein x has a value between 0.1 and 2), and so forth. Other examples of materials suitable for the RSL could include $Si_xGe_yO_z$ (where X, Y and Z are respective suitable positive numbers), a silicon oxide (e.g., $SiO_N$, where N is a suitable positive number), amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, or a suitable combination thereof.

In some embodiments, a RSL employed as part of a non-volatile memory device (non-volatile RSL) can include a relatively large number (e.g., compared to a volatile selector device) of material voids or defects to trap particles (at least at low voltage) within the RSL. The large number of voids or defects can facilitate formation of a thick, stable structure of the particles. In such a structure, these trapped particles can maintain the non-volatile memory device in a low resistance state in the absence of an external stimulus (e.g., electrical power), thereby achieving non-volatile operation. In other embodiments, a RSL employed for a volatile selector device (volatile RSL) can have very few particle-trapping voids or defects. Because of the few particle-trapping voids/defects, a conductive filament formed in such an RSL can be quite thin, and unstable absent a suitably high external stimulus (e.g., an electric field, voltage, current, joule heating, or a suitable combination thereof). Moreover, the particles can be selected to have high surface energy, and good diffusivity within the RSL. This leads to a conductive filament that can form rapidly in response to a suitable stimulus, but also deform quite readily, e.g., in response to the external stimulus dropping below a magnitude associated with maintaining continuity of the conductive filament (e.g., a deformation magnitude). Note that a volatile RSL and conductive filament for the selector device can have different electrical characteristics than a conductive filament and non-volatile RSL for the non-volatile memory device. For instance, the selector device RSL can have higher intrinsic electrical resistance (e.g., from material selected for the RSL), and can have higher on/off current ratio, among others.

An active metal layer for a filamentary-based memory cell can include, among others: silver (Ag), gold (Au), titanium (Ti), titanium-nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), hafnium (Hf), and palladium (Pd). Other suitable conductive materials, as well as compounds, alloys, or combinations of the foregoing or similar materials can be employed for the active metal layer in some aspects of the subject disclosure. Some details pertaining to embodiments of the subject disclosure similar to the foregoing example(s) can be found in the following U.S. patent applications that are licensed to the assignee of the present application for patent: application Ser. No. 11/875,541 filed Oct. 19, 2007 and application Ser. No. 12/575,921 filed Oct. 8, 2009, and the following U.S. patent application assigned to the assignee of the present application for patent: application Ser. No. 14/588,185 filed Dec. 31, 2014.

In some disclosed embodiments, a filamentary based selector device can operate in a bipolar fashion, behaving differently in response to different polarity (or direction, energy flow, energy source orientation, etc.) external stimuli. As an illustrative example, in response to a first polarity stimulus exceeding a first threshold voltage (or set of voltages), the filamentary selector device can change to a second state from the first state. Moreover, in response to a second polarity stimulus exceeding a second threshold voltage(s), the filamentary selector device can change to a third state from the first state. In some embodiments, the third state can be substantially the same as the first state, having the same or similar measurably distinct characteristic (e.g., electrical conductivity, and so forth), having the same or similar magnitude of threshold stimulus (though of opposite polarity or direction), or the like. In other embodiments, the third state can be distinct from the second state, either in terms of the measurable characteristic (e.g., different electrically conductivity value in response to the reverse polarity as compared to the forward polarity) or in terms of threshold stimulus associated with transitioning out of the first state (e.g., a different magnitude of positive voltage required to transition to the second state, compared to a magnitude of negative voltage required to transition to the third state).

For a non-volatile filamentary-based memory cell, a conductive path or a filament forms through a non-volatile RSL in response to a suitable program voltage applied across the memory cell. In particular, upon application of a programming voltage, metallic ions are generated from the active metal layer and migrate into the non-volatile RSL layer. The metallic ions can occupy voids or defect sites within the non-volatile RSL layer. In some embodiments, upon removal of the bias voltage, the metallic ions become neutral metal particles and remain trapped in voids or defects of the non-volatile RSL layer. When sufficient particles become trapped, a filament is formed and the memory cell switches from a relatively high resistive state, to a relatively low resistive state. More specifically, the trapped metal particles provide the conductive path or filament through the non-volatile RSL layer, and the resistance is typically determined by a tunneling resistance through the non-volatile RSL layer. In some resistive-switching devices, an erase process can be implemented to deform the conductive filament, at least in part, causing the memory cell to return to the high resistive state from the low resistive state. More specifically, upon application of an erase bias voltage, the metallic particles trapped in voids or defects of the non-volatile RSL become mobile and migrate back towards the active metal layer. This change of state, in the context of memory, can be associated with respective states of a binary bit. For an array of multiple memory cells, a word(s), byte(s), page(s), block(s), etc., of memory cells can be programmed or erased to represent zeroes or ones of binary information, and by retaining those states over time in effect storing the binary information In various embodiments, multi-level information (e.g., multiple bits) may be stored in such memory cells.

It should be appreciated that various embodiments herein may utilize a variety of memory cell technologies, having different physical properties. For instance, different resistive-switching memory cell technologies can have different discrete programmable resistances, different associated program/erase voltages, as well as other differentiating characteristics. For instance, various embodiments of the subject disclosure can employ a bipolar switching device that exhibits a first switching response (e.g., programming to one of a set of program states) to an electrical signal of a first polarity and a second switching response (e.g., erasing to an erase state) to the electrical signal having a second polarity. The bipolar switching device is contrasted, for instance, with a unipolar device that exhibits both the first switching response (e.g., programming) and the second switching response (e.g., erasing) in response to electrical signals having the same polarity and different magnitudes.

Where no specific memory cell technology or program/erase voltage is specified for the various aspects and embodiments herein, it is intended that such aspects and embodiments incorporate any suitable memory cell technology and be operated by program/erase voltages appropriate to that technology, as would be known by one of ordinary skill in the art or made known to one of ordinary skill by way of the context provided herein. It should be appreciated further that where substituting a different memory cell technology would require circuit modifications that would be known to one of ordinary skill in the art, or changes to operating signal levels that would be known to one of such skill, embodiments comprising the substituted memory cell technology(ies) or signal level changes are considered within the scope of the subject disclosure.

FIG. 1 illustrates a block diagram of an example memory controller 100 for a data storage device, according to one or more embodiments of the present disclosure. Memory controller 100 can be configured to operate in conjunction with a hard drive media and a non-volatile buffer to store data provided by a host device. Moreover, memory controller 100 can emulate data storage performance greater than physical capabilities of the hard drive media, utilizing higher read/write performance of the non-volatile buffer.

Memory controller 100 can comprise control logic, memory and processor(s) 102 for implementing functions of memory controller 100. A host interface 104 facilitates communication between memory controller 100 and a host device, such as a computer, a tablet, a server, and so forth. Host interface 104 can be communicatively connected to the host device by a wired connection (e.g., a data cable, an Ethernet connection, a FireWire® connection, a USB connection, etc.), a wireless connection (e.g., a WiFi® connection, a cellular connection, a wireless optical link, a peer-to-peer wireless connection, etc.) a network (e.g., local area network, wide area network, the Internet, and so on), or the like. Additionally, a non-volatile memory (NVM) buffer interface 108 communicatively connects memory controller 100 with a NVM buffer device, and a hard drive interface 106 connects memory controller 100 with a hard drive media. In various embodiments, NVM buffer interface 108 and hard drive interface 106 can be wired, wireless or network connections suitable to transfer data and data-related commands between memory controller 100 and the NVM buffer device and hard drive media, respectively. In various embodiments, the NVM buffer device can have much faster read/write performance (though smaller storage capacity) than the hard drive media.

In operation, data and a data command 110 can be provided by a host device to memory controller via host interface 104. Control logic, memory and processor(s) 102 can read the data command, and transfer the data in a data buffer(s) 112 to the NVM buffer device over NVM buffer interface 108. Once the content of data buffer(s) 112 is written to the NVM buffer device, a command complete acknowledgment can be provided by controller 100 to the host device via host interface 104, enabling the host device to de-allocate host memory reserved for the data, and utilize the host memory for other applications. Of significance, the command complete acknowledgment can be provided to the host device prior to the content of data buffer(s) 112 being stored at the hard drive media. Because the NVM buffer device has substantially higher read/write performance than the hard drive media, the host memory receives the command complete acknowledgment, and can free up host memory, much more quickly than a time required to store the data directly at the hard drive media. In this manner, memory controller 100 can emulate a higher performance storage device with the storage capacity of the hard drive media.

Once the command complete acknowledgment is sent to the host device, memory controller 100 can transfer the data written to the NVM buffer device for storage at the hard drive media. For instance, a subset of data 118 stored in the NVM buffer device can be sent on a data channel 120 of hard drive interface 106 to the hard drive media. In some embodiments, the subset of data 118 can comprise the data substantially as received in data and data command 110, or in data buffer(s) 112. In other embodiments, the subset of data 118 can be re-arranged for storage at the hard drive media. As an example, a data compilation component 134 can arrange subsets of the data 118 at least in part as a function of read/write head position of the hard drive media (e.g., see FIG. 4, infra). A servo interface 122 can be employed to issue sector-specific write commands in conjunction with transferring data from the NVM buffer device to the hard drive media.

Figure 3:
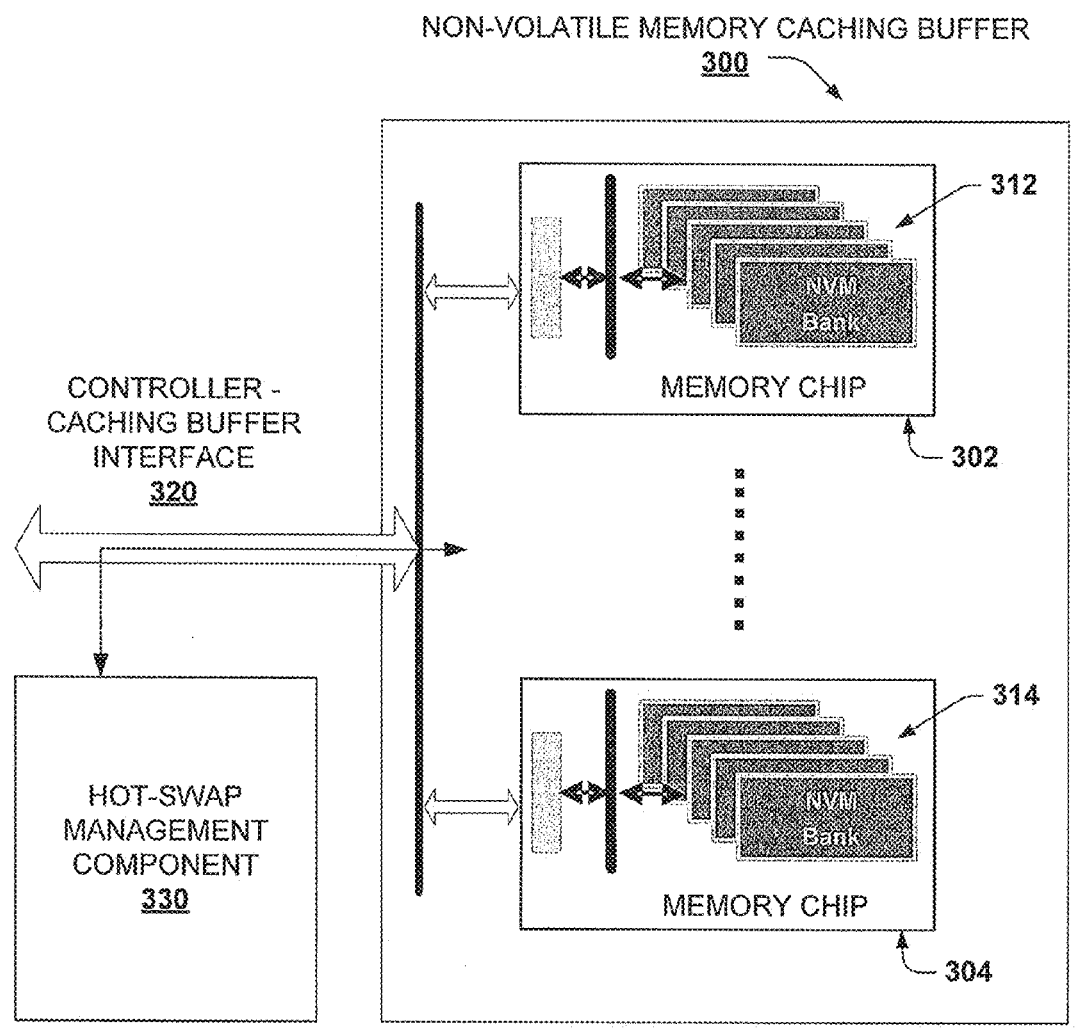
FIG. 3 illustrates a block diagram of an example removable non-volatile caching buffer comprising resistive switching memory chips, in further embodiments.

In further embodiments, NVM buffer interface 106 can facilitate communicatively connecting and disconnecting control logic, memory and processor(s) 102 to/from a removable NVM buffer device (e.g., see FIG. 3, infra). A hot-swap management component 132 can detect a connection or disconnection of removable media from NVM buffer interface 108, and determine whether the NVM buffer device is currently connected to memory controller 100. If connected, data to be written to the hard drive media can be buffered at the NVM buffer device, as described herein. Otherwise, if not connected, control logic, memory and processor(s) 102 can store the data directly to the hard drive media, acknowledging a write command once the data is stored therein. Although while removable NVM buffer media is disconnected memory controller does not achieve the higher performance of the NVM buffer device, the removable NVM buffer media can extend longevity of a data storage device (e.g., beyond intrinsic longevity of the NVM itself), and enable the data storage device to be upgradeable with newer NVM technologies. In one embodiment of the invention, all data from NVM buffer device is transferred to the hard drive prior to its removal. In another embodiment of the invention, because endurance of the NVM buffer device is substantially higher than the hard drive and hence, to the NVM buffer device is not configured to be removable.

Figure 2:
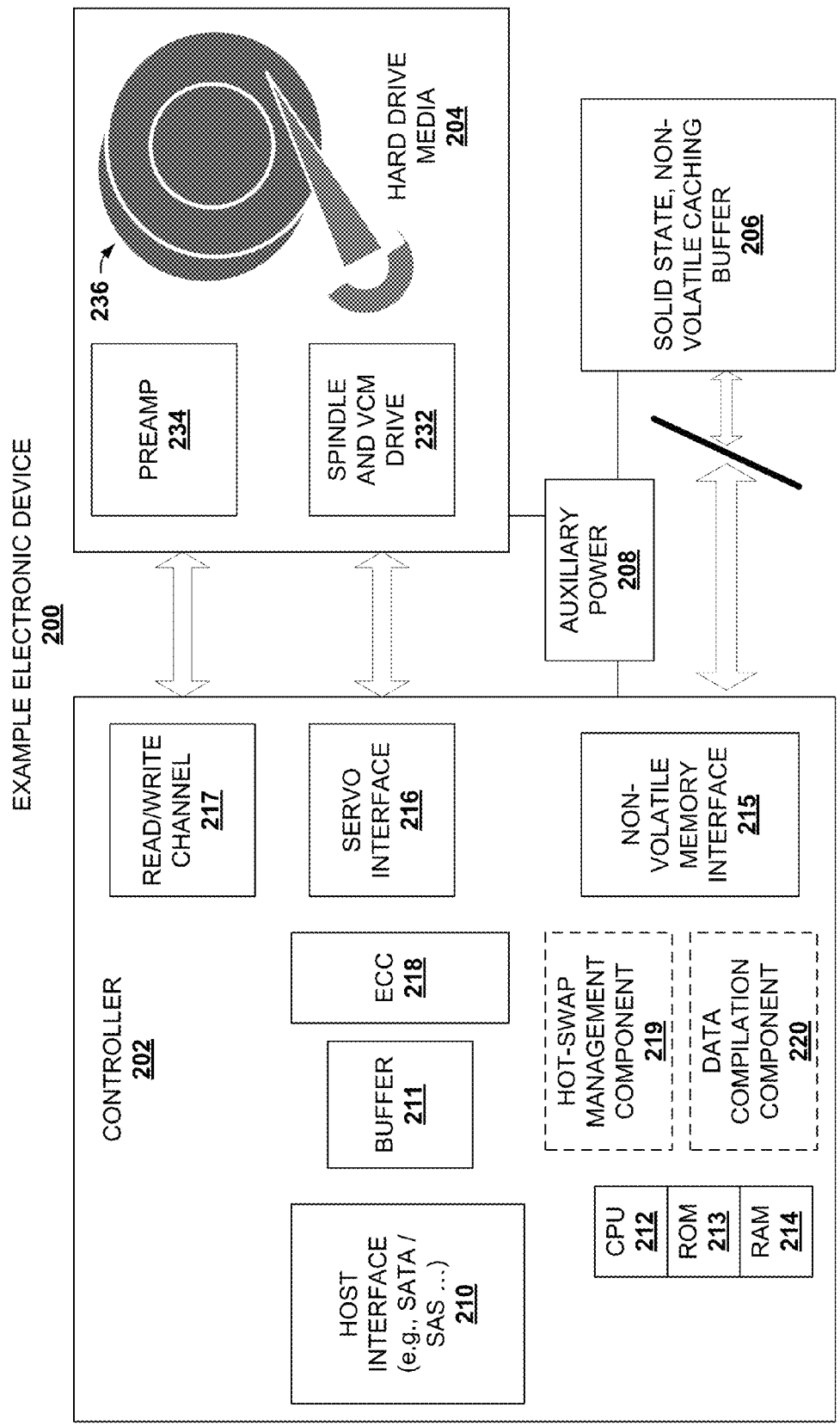
FIG. 2 depicts a block diagram of a sample electronic device employing a non-volatile caching buffer in conjunction with storage media, in an embodiment.

FIG. 2 illustrates a block diagram of an example electronic device 200 according to one or more disclosed embodiments. Electronic device 200 can comprise a controller 202, a hard drive media 204 and a NVM caching buffer 206, as depicted. In some embodiments, controller 202, hard drive media 204 and NVM caching buffer 206 can be packaged as a single data storage device (e.g., enclosed in a single housing, secured to a common support frame, communicatively connected by physical data or command interfaces, or the like). In other embodiments one or more of controller 202, hard drive media 204 or NVM caching buffer 206 can be located remotely from another of such components (e.g., physically separated and communicatively connected over a network).

Controller 202 can be configured to operate in conjunction with hard drive media 204 and NVM caching buffer 206, managing transfer of data to or from hard drive media 204 and NVM caching buffer 206, implementing commands issued to electronic device 200, responding with acknowledgments to such commands, and so on. In an embodiment, controller 202 can be substantially similar to memory controller 100 of FIG. 1, supra; however, the subject disclosure is not limited to this embodiment.

In various embodiments, controller 202 can comprise a host interface 210 to communicate with a host device (e.g., computer, etc.). Host interface 210 can include standardized interfaces, such as a SAS interface (serial attached SCSI, or small computer system interface), a SATA interface (serial AT attachment), a PATA interface (parallel AT attachment) or other suitable interface for connection of storage devices (e.g., integrated drive electronics (IDS), extended IDE (EIDE), ultra ATA, and so on). In some embodiments, host interface 210 can employ a non-standard or custom interface. Commands received over host interface 210 can be temporarily held in a buffer 211 for processing by a CPU 212, according to protocols or instructions maintained in ROM 213 or RAM 214. Data transferred over host interface 210 can also be held temporarily in buffer 211, whether for output to a host device (in the case of data retrieved from hard drive media 204 or NVM caching buffer 206), or for writing to hard drive media 204 (in the case of data received from a host device).

Hard drive media 204 can comprise any suitable hardware components 236, such as a storage platter(s), read/write component(s) or control logic (or subset of the control logic) of an optical disc drive (e.g., compact disc (CD), digital versatile disc (DVD), Blu-ray disc, laser disc, and so forth), a disk drive (e.g., hard drive, floppy disk, etc.), a magnetic tape drive, or the like, or a suitable combination thereof. Depending on a type of drive used, additional components can be utilized for operating the hardware components 236 of hard drive media 204, such as a preamp 234 for powering movable mechanical parts and a spindle and voice coil motor (VCM) drive 232 for moving hardware components 236 relative a read/write head (not depicted) of hard drive media 204, as one example. In various embodiments, hardware components 236 can comprise a disk(s) having multiple storage locations, or sectors, and a head connected to an end of an actuator arm. The disk(s) can be powered by a spindle and VCM drive 232 to rotate relative to the head and actuator arm. In an embodiment(s), the disk(s) can comprise radially spaced concentric tracks for recording data (e.g., host data, servo data, metadata, etc.). Embedded servo sectors can comprise head positioning information, sector location information, and the like, read by the head and processed by a servo controller (not depicted) to control actuator arm movement relative to a surface(s) of the disk(s).

One problem addressed by electronic device 200 is unexpected power loss. During expected power loss, such as an ordered shut-down command processed by controller 202, power can be maintained until programmed functions are complete. Thus, controller 202 can expect to have sufficient power to write cached host data stored in NVM caching buffer 206 to hard drive media 204—including data stored on the head of hardware components 236—and seat the actuator arm and head of hardware components 236 in rest position, prior to termination of power. However, during unexpected power loss, the presumption of sufficient power to complete programmed functions may not be the case. Accordingly, electronic device 200 can utilize auxiliary power 208 (e.g., capacitor array, back-EMF device, etc.) to complete a modified ordered shutdown prior to complete loss of power. The modified ordered shutdown can involve writing to non-volatile memory only data currently stored in volatile memory. To accommodate the modified ordered shutdown, auxiliary power 208 can be configured to provide substantially less power capacity than would be required for conventional hard drives, which store all cached data in volatile memory. This is because NVM caching buffer 206 can store data without access to power.

Utilizing auxiliary power 208 for a modified ordered shutdown, in an embodiment, controller 202 can retain data stored in NVM caching buffer 206 in response to detecting a non-ordered shut-down (e.g., forego writing data stored in NVM caching buffer 206 to hard drive media 204 in response to the non-ordered shut-down). In another embodiment, controller 202 can be configured to employ auxiliary power 208 in response to detecting the non-ordered shut-down to determine whether data is contained at the head of the actuator arm of hardware components 236. If the head contains data, controller 202 can employ auxiliary power 208 to write the data to a suitable sector(s) of the disk(s) of hard drive media 204, and to write metadata related to currently cached data in NVM caching buffer 206, to the NVM caching buffer 206. Metadata can be utilized to record a current state of a host write, where the data (or subsets thereof) is (are) located (e.g., at hard drive media 204, received at controller 202, written to NVM caching buffer, etc), identity of data written from the head to hard drive media 204 as part of the non-ordered shutdown, and so forth. This metadata can, for instance, delineate the data most recently written to hard drive media 204 and data within NVM caching buffer 206 remaining to be written to hard drive media 204. Additionally, auxiliary power 208 can be employed to seat the actuator arm. In a further embodiment, the suitable sector(s) can be determined as provided at FIGS. 4 and 5, infra. In another embodiment, where no data is contained on the head, controller 202 can instead employ auxiliary power 208 to merely seat the actuator arm and write the metadata—if any—to NVM caching buffer 206.

In various embodiments, NVM caching buffer 206 can comprise solid state non-volatile memory having high read/write performance and read/write endurance relative to hard drive media 204. In some embodiments, NVM caching buffer can employ resistive switching memory chips having data throughputs exceeding several gigabits per second. As an example, see U.S. patent application Ser. No. 14/749,947 filed Jun. 25, 2015, U.S. patent application Ser. No. 14/750,740 filed Jun. 25, 2015 and U.S. patent application Ser. No. 14/750,293 filed Jun. 25, 2015. In such embodiments, the read/write performance of NVM caching buffer 206 can be significantly faster than a read/write performance of hard drive media 204. In various embodiments, data transferred from NVM caching buffer 206 to hard drive media 204 can be written block-by-block or page-by-page. In some embodiments, data transferred from NVM caching buffer 206 to hard drive media 204 can be written on a byte-by-byte basis, taking advantage of byte accessibility (or even bit accessibility) of resistive switching memory devices. In other embodiments, groups of bytes less than a single page can be written from NVM caching buffer 206 to hard drive media 204. Byte-level transfer can enable higher write speeds to hard drive media 204 and better cache longevity, as compared with other non-volatile memory. Byte-level writing can enable a first subset of host data to be transferred from NVM caching buffer 206 to hard drive media 204, while a second subset of host data is being transferred from the host device to NVM caching buffer 206. Further, writing to hard drive media 204 need not wait for a full block of the host data to first be transferred to NVM caching buffer 206; rather, once a byte is received (or multiple bytes are received), transfer of one or more bytes from NVM caching buffer 206 to hard drive media 204 can begin. Moreover, this facilitates improved longevity for NVM caching buffer 206, because byte-level writes (or bit-level writes) add write cycles only to the respective byte(s) (or bit(s)), not to an entire block, as with block-level non-volatile memories. Accordingly, wear leveling can be greatly simplified, longevity increased and data transfer made more efficient by employing resistive switching memory devices for NVM caching buffer 206.

In conjunction with a write command received via host interface 210 from a host device, controller 202 can also receive a set of data associated with the write command for storage. In some embodiments, an optional hot-swap management component 219 can determine whether a removable NVM caching buffer 206 is currently connected to a non-volatile memory interface 215 and, if so, the set of data can be written to NVM caching buffer 206. Otherwise, hot-swap management component 219 can direct controller 202 to store the received data directly at hard drive media 204, utilizing a read/write channel 217 and servo interface 216. In other embodiments, where NVM caching buffer 206 is non-removable and hot-swap management component 219 is not employed, the received set of data can be written first to NVM caching buffer 206 via non-volatile memory interface 215. In one embodiment of the invention, a parameter within a host command can be provided to establish the destination of the associated data: hard drive or NVM caching buffer, allowing the host to make that determination. Applications running on the host can be optimized if given the option to select usage of its data and it's destination, based on performance characteristics of the destination (e.g., NVM caching buffer, or hard drive media).

Once a received set of data is written to NVM caching buffer 206, a command complete acknowledgment is sent by controller 202 to the host device. Transmission of the command complete acknowledgment facilitates de-allocation of host memory reserved for the set of data. This can be accomplished in part by the use of high performance non-volatile memory for NVM caching buffer 206; if a power failure occurs, data loss can be mitigated or avoided despite the data not yet being stored at hard drive media 204. Moreover, because data can be written to NVM caching buffer 206 much more quickly than to hard drive media 204, the de-allocation of host memory can be accomplished much more quickly by buffering the set of data at NVM caching buffer 206. By comparison, NAND Flash memories have slow program time in the range of one or more milliseconds, which is generally not suitable for cache/buffer applications. Short of using high performance non-volatile memory, hard disk drives tend to use volatile DRAM for buffering data, risking data loss in the event of sudden power failure. Furthermore, NVM caching buffer 206 will sustain far more write operations, operating as a read or write cache, than the hard drive during device operation. As such, the non-volatile memory used for NVM caching buffer 206 should have good longevity with very high write counts. Again, NAND Flash memories typically have program/erase counts of 5000 or fewer, rendering NAND Flash unsuitable for buffering or caching data. A storage system employing high performance high endurance non-volatile memory such as RRAM or other resistive-switching memory, can minimize or avoid expensive DRAM chips and hence, reduce cost of manufacturing the storage system.

In various embodiments, controller 202 can employ NVM caching buffer 206 as a read or write cache, in addition to a buffer. Read and write cache policies can be stored, for instance, in RAM 214 (or ROM 213). As an example, for a read command issued by a host device, controller 202 can access NVM caching buffer 206 to determine whether requested data (or a subset of the requested data) is stored at NVM caching buffer 206. If the requested data is stored at NVM caching buffer 206, the data can be quickly retrieved and transmitted to the host device over host interface 210. If a subset of the data is stored at NVM caching buffer 206, the stored subset of the data can be transferred to the host device, while the remaining data is accessed at hard drive media 204. In the latter case, performance of electronic device 200 can still be improved by reading and transferring the subset of data from the relatively fast NVM caching buffer 206, while the remainder is accessed at the relatively slower hard drive media 204.

In further embodiments, NVM caching buffer 206 can also serve as a write cache for optimizing write operations to hard drive media 204. Optimization can be implemented to minimize read/write head movement for hard drive media 204, in various embodiments (e.g., see FIG. 4, infra). Subsets of data to be written to different sectors of hard drive media 236 can be ordered as a function of proximity to a current read/write head location. A data compilation component 220 can obtain the current read/write head location, as well as logical block address (LB A) locations for the subsets of data. Data compilation component 220 can then order the subsets of data as a function of proximity of associated LBA locations to the current read/write head location. Such write optimization can be employed to reduce power consumption, write time and wear of hard drive media 204.

FIG. 3 illustrates a block diagram of an example NVM caching buffer 300, according to additional embodiments of the present disclosure. In some embodiments, NVM caching buffer 300 can be a removable memory that can be connected or disconnected from an electronic device. In other embodiments, NVM caching buffer 300 can be fixed within (or communicatively connected to) the electronic device. NVM caching buffer can comprise one or more memory chips, such as memory chips 302, 304. Though two memory chips 302, 304 are illustrated, it should be understood that other numbers of memory chips can be included within NVM caching buffer 300, in various embodiments. Respective memory chips 302, 304 can also comprise one or more banks of memory, which can generally be operable in parallel. As depicted, memory chip 302 includes multiple memory banks 312, and memory chip 304 includes a separate set of multiple memory banks 314.

An interface, such as controller—caching buffer interface 320 can facilitate data and command communication between NVM buffer interface 320 and a memory controller (e.g., memory controller 202 of FIG. 2, supra). Controller—caching buffer interface 320 can further facilitate providing electrical power to NVM caching buffer 300, control and communication protocols for initiating communication with NVM caching buffer 300, or the like, in at least some embodiments. Examples of controller—caching buffer interface 300 can include a standardized interface (e.g., a USB 3.2 interface, a USB 4.0 interface, or other suitable USB standard, an open NAND Flash interface (ONFI) standard interface, a dynamic random access memory (DRAM) interface, such as a low-power double data rate (LPDDR) 3 interface, a LPDDR 4 interface, etc.), or a non-standard interface (e.g., a proprietary interface, a modified standard interface, or the like; see for example U.S. patent application Ser. No. 14/750,740, filed Jun. 25, 2015).

A hot-swap management component 330 can facilitate inter-operability between a memory controller and a removable NVM caching buffer 300. Hot-swap management component 330 can comprise hardware suitable to detect a connection or disconnection of NVM caching buffer 300 with controller—caching buffer interface 320. Detection can be based on change in electrical characteristic (e.g., capacitance, resistance, line voltage, etc.) of controller—caching buffer interface 320 in response to connection or disconnection of NVM caching buffer 300. An example includes detection of a USB device in a USB interface slot, or detection of removal of the USB device from the USB interface slot. In response to detecting a connection of NVM caching buffer 300, hot-swap management component 330 can execute one or more protocols to initiate a communication between the memory controller and the removable NVM caching buffer 300. Once the communication is established, the memory controller can operate according to a first set of protocols configured to employ the removable NVM caching buffer 300 as a data cache or data buffer for a hard drive 204, as described herein, or as made known to one of ordinary skill in the art by way of the context provided herein. In response to detecting a disconnection of the removable NVM caching buffer 300, hot-swap management component 330 can notify the memory controller of the disconnection. The memory controller can then switch to a second set of protocols configured, for instance, to operate a hard drive (e.g., hard drive 204) without caching or buffering data at the removable NVM caching buffer 300.

In some embodiments, NVM caching buffer 300 can be removable from controller—caching buffer interface 320 as a single entity. In this case, the entire NVM caching buffer 300 is removably connectable to controller—caching buffer interface 320. In other embodiments, one or more memory chips 302, 304 can be separably removable from and connectable to NVM caching buffer 300 and controller—caching buffer interface 320.

Figure 4:
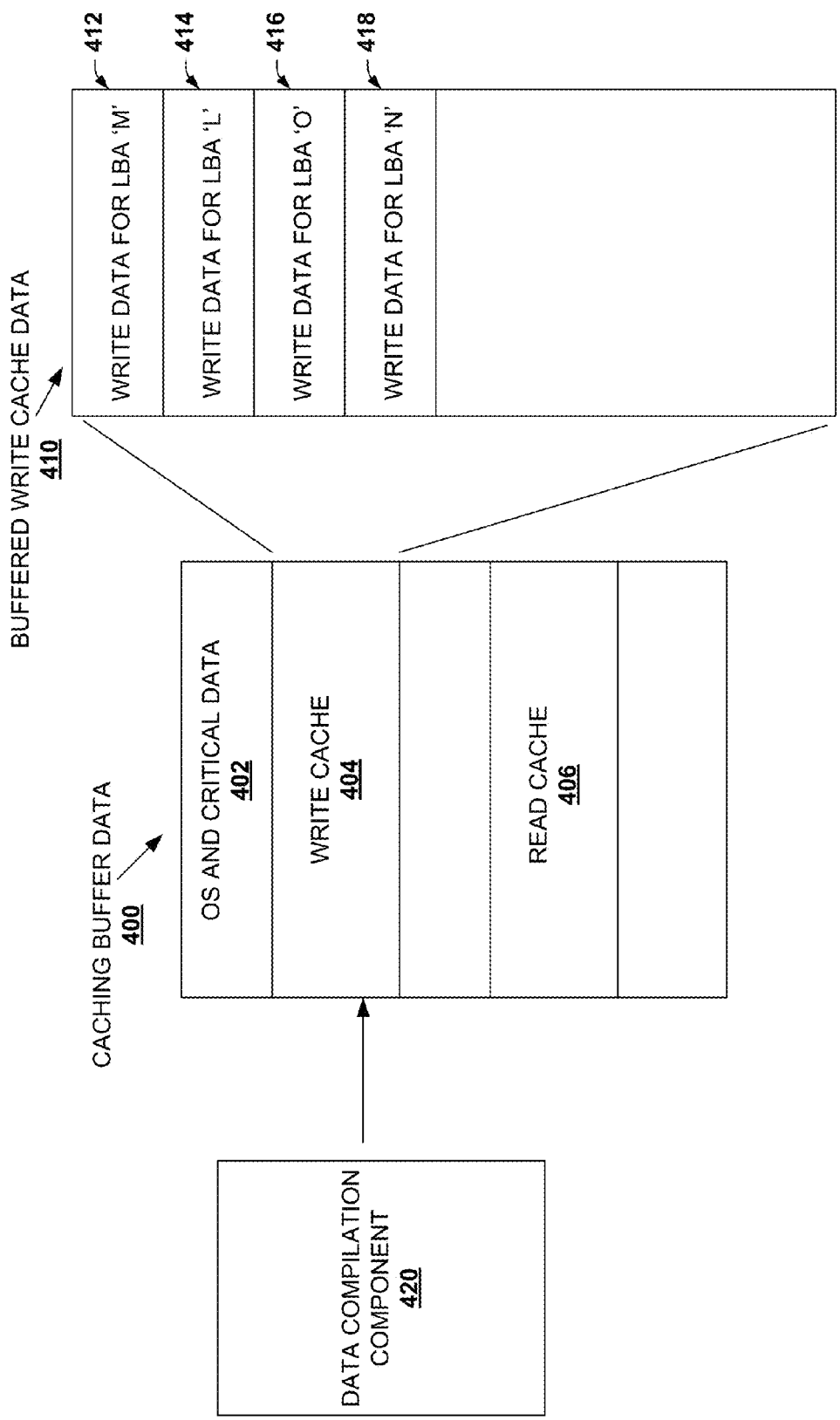
FIG. 4 depicts a block diagram of an example data compilation for improved efficiency with write cache operations in one or more embodiments.
Figure 5:
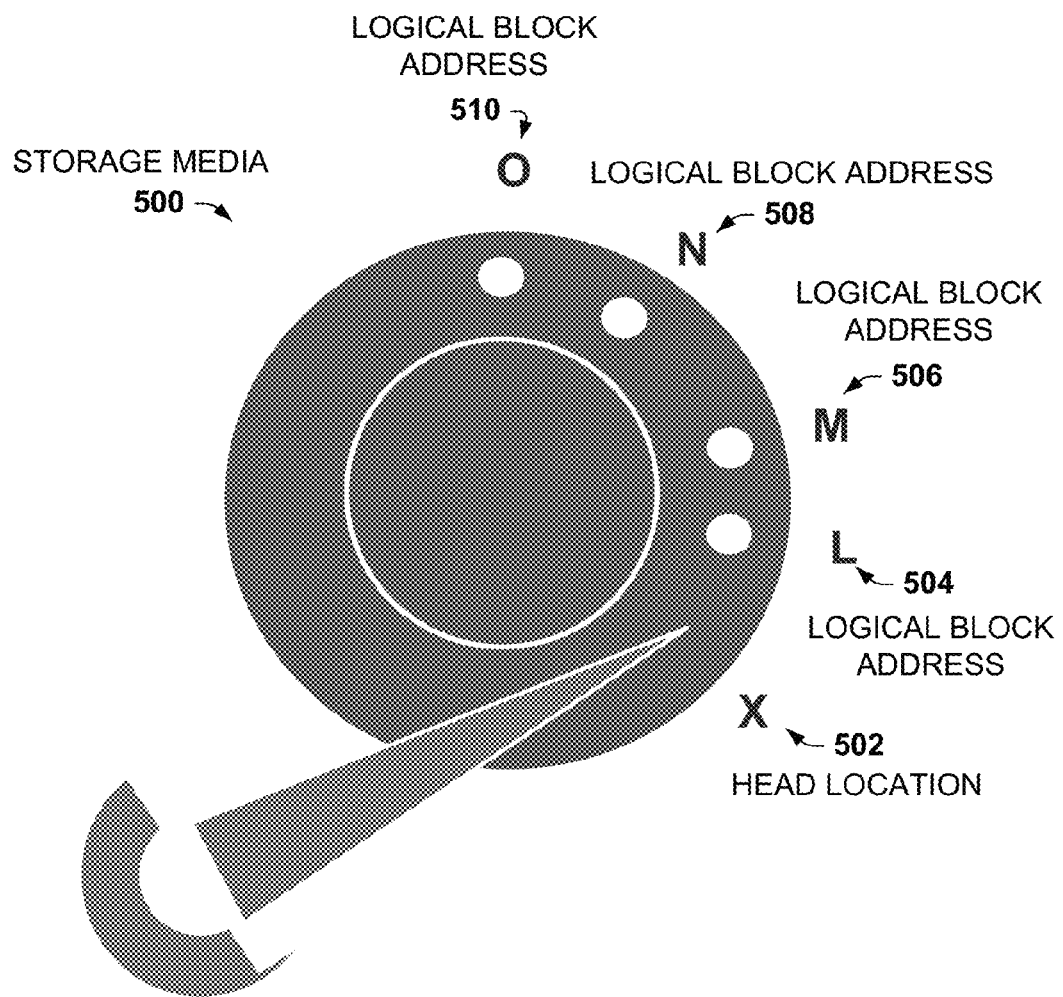
FIG. 5 illustrates an example storage media and a read/write head location relative to a set of logical block addresses, in one or more embodiments.

FIGS. 4 and 5 illustrate diagrams of example data configuration for optimizing storage of data at a hard drive, in one or more embodiments of the present disclosure. Referring initially to FIG. 4, there is depicted a data compilation component 420 configured to operate in conjunction with a NVM caching buffer (e.g., NVM caching buffer 206 of FIG. 2, supra). Caching buffer data 400 stored by the NVM caching buffer can include a high performance storage tier for storing operating system (OS) and critical data 402, write cache data 404, and read cache data 406, among other data not depicted. The high performance storage tier 402 can, for example, store an operating system(s) (OS) for virtual machines (VMs). This tier can facilitate many VMs (e.g., 100s to 1000s of VMs, or more) booting quickly and with low latency. By utilizing high performance memory, such as resistive switching memory or the like, the NVM caching buffer can accommodate a boot storm, e.g., where large numbers of VMS access the OS at substantially the same time, while still maintaining acceptable latency performance.

Subsets of the write cache data 404 can include respective data subsets to be written to different sectors of a hard drive. For instance, referring to FIG. 5, a hard drive storage media 500 is illustrated, comprising several logical block addresses (LBAs). The LBAs can include a logical block address O 510, logical block address N 508, logical block address M 506 and logical block address L 504, among others (referred to collectively as logical block addresses 504-510).

Each of logical block addresses 504-510 reside in respective locations of hard drive storage media 500. Additionally, hard drive storage media 500 can comprise a read/write head, having a current read/write head location X 502. Data compilation component 420 can query hard drive storage media 500 to obtain respective locations of the read/write head and of each of logical block addresses 504-510.

An optimization function can be employed by data compilation component 420 to reduce power consumption and enhance longevity of the read/write head of hard drive storage media 500. As an example, the optimization function can be configured to minimize read/write head movement involved in writing data to hard drive storage media 500. To this end, data compilation component 520 can determine distances of respective logical block address locations to read/write head location X 502, and write subsets of write cache data 404 to associated logical block addresses according to smallest distance from the read/write head location X 502. Thus, referring to data composition 410, buffered write cache data 410 can comprise subsets of write cache data 404 stored in the NVM caching buffer. In the depicted example, the subsets of write cache data 404 are ordered as follows: write data for LBA 'M' 412, write data for LBA 'L' 414, write data for LBA 'O' 416 and lastly write data for LBA 'N' 418. To minimize read/write head movement when transferring write cache data 404 from the NVM caching buffer to hard drive media, data compilation component 420 can write the subsets of buffered write cache data 410 in a different order than that which they are stored in the NVM caching buffer. Particularly, data compilation component 420 can write the subsets of data in an order that is a function of proximity of associated logical block address locations to read/write head location X 502. For the example of FIGS. 4 and 5, data compilation component 420 can transfer (e.g., write) data to LBA L 504 first, followed by data to LBA M 506 second, then data to LBA N 508 third, followed by data to LBA O 510 last. This in turn can minimize power consumption associated with moving the read/write head to respective sectors at logical block addresses 504-510, as well as extend longevity of the read/write head.

The aforementioned diagrams have been described with respect to interaction between several components of an electronic device, a host device, an interface, a memory controller, a storage device, or a memory. It should be appreciated that in some suitable alternative aspects of the subject disclosure, such diagrams can include those components, devices, memory, controller, etc., specified therein, some of the specified components/devices/memory/controller, or additional components/devices/memory/controller. Sub-components can also be implemented as connected to other sub-components rather than included within a parent component. For example, multiple memory banks can be provided on separate memory chips, instead of on a single chip. As another example, hot-swap management component 219 and data compilation component 220 can be implemented by a single component, or can respectively be implemented by multiple components operating in conjunction. Additionally, it is noted that one or more disclosed processes can be combined into a single process providing aggregate functionality. Components of the disclosed devices/memory/controller can also interact with one or more other components not specifically described herein but known by those of skill in the art.

In view of the exemplary diagrams described supra, process methods that can be implemented in accordance with the disclosed subject matter will be better appreciated with reference to the flow charts of FIGS. 6-9. While for purposes of simplicity of explanation, the methods of FIGS. 6-9 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks are necessarily required to implement the methods described herein. Additionally, it should be further appreciated that some or all of the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Figure 6:
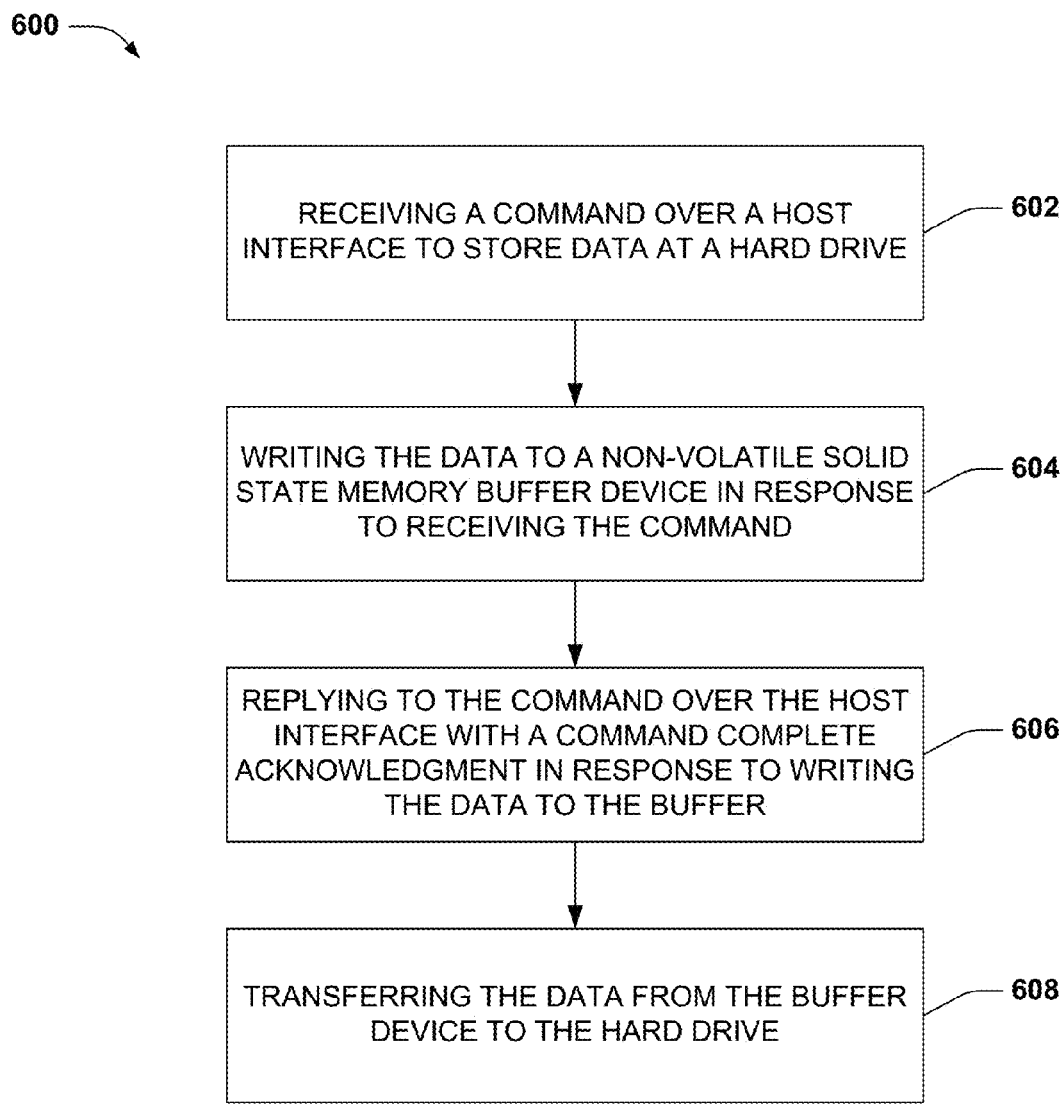
FIG. 6 depicts a flowchart of a sample method for operating a storage device, in an embodiment.

FIG. 6 illustrates a flowchart of an example method 600 for operating a storage device, in one or more disclosed embodiments. At 602, method 600 can comprise receiving a command over a host interface to store data at a hard drive. At 604, method 600 can comprise writing the data over a buffer interface to a buffer comprising a non-volatile solid state memory device in response to receiving the command. Additionally, at 606, method 600 can comprise replying to the command over the host interface with a command complete acknowledgment in response to writing the data to the buffer. In one or more embodiments, method 600 can further comprise, at 608, transferring the data from the buffer device to the hard drive following replying to the command with the command complete acknowledgment.

In one or more additional embodiments, method 600 can additionally comprise obtaining a head position of a read-write head of the hard drive, and determining sector locations for a set of sectors of the hard drive to which subsets of the data are to be written. Additionally, method 600 can comprise writing the subsets of the data to the hard drive in order of proximity of respective associated sector locations to the head position of the read-write head of the hard drive.

In a further embodiment, method 600 can additionally comprise detecting a disconnection of the non-volatile solid state memory device from the buffer interface. In response to detecting the disconnection, method 600 can comprise writing a subset of the data directly to the hard drive. In another embodiment, method 600 can further comprise detecting a connection of the non-volatile solid state memory device to the buffer interface. In response to detecting the connection, method 600 can comprise resuming writing the data to the buffer.

Figure 7:
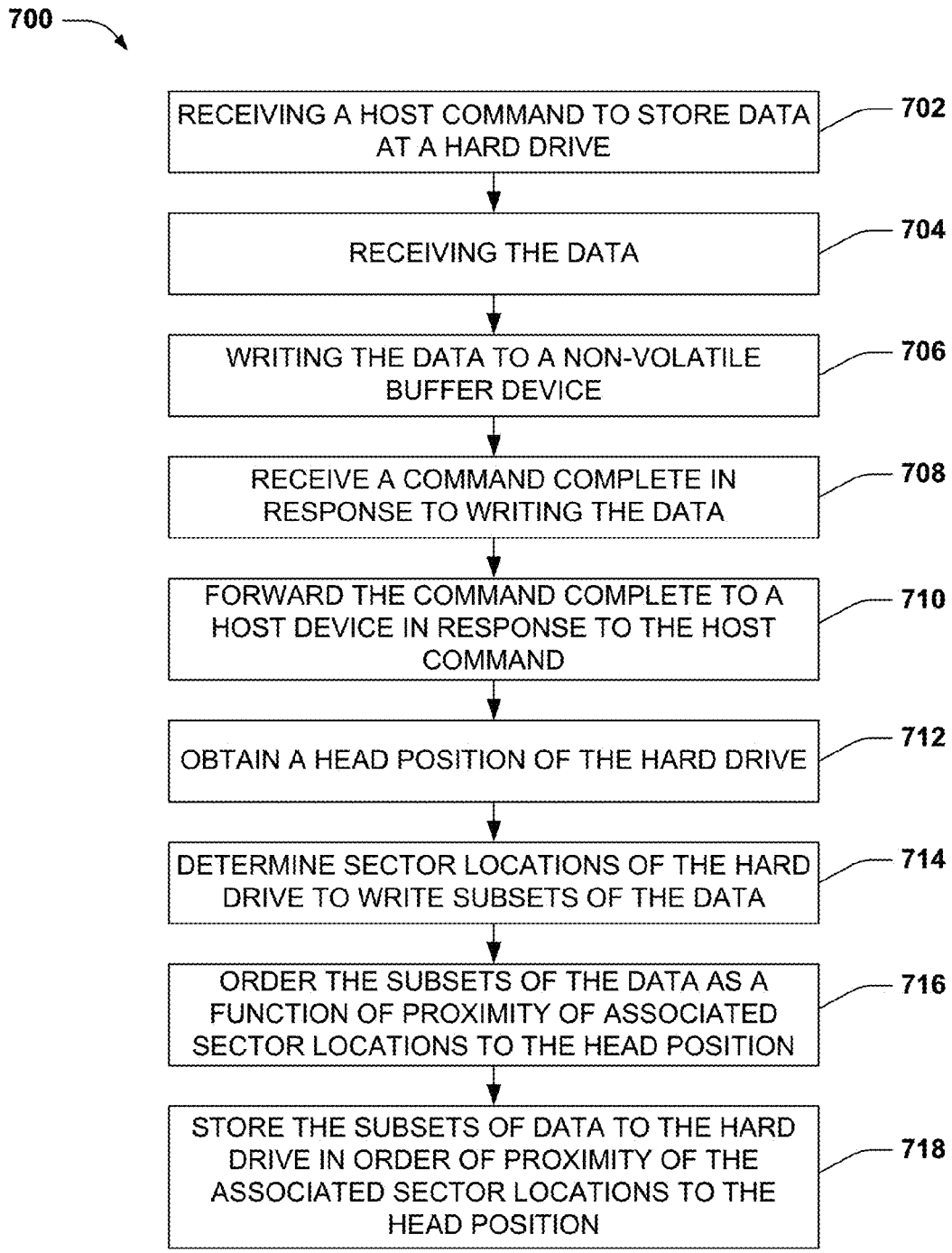
FIG. 7 illustrates a flowchart of an example method for a write cache operation utilizing a non-volatile caching buffer, in further embodiments.

Referring to FIG. 7, a flowchart of a sample method 700 for operating a storage device according to one or more additional embodiments is illustrated. At 702, method 700 can comprise receiving a host command to store data at a hard drive. At 704, method 700 can comprise receiving the data and, at 706, method 700 can comprise writing the data to a non-volatile buffer device. At 708, method 700 can further comprise receiving a command complete acknowledgment in response to writing the data to the non-volatile buffer device. At 710, method 700 can comprise forwarding the command complete acknowledgment to a host device in response to the host command.

In addition to the foregoing, method 700 can further comprise, at 712, obtaining a head position of the hard drive. At 714, method 700 can comprise determining sector locations of the hard drive for a set of sectors to which respective subsets of the data are to be written. At 716, method 700 can comprise ordering the subsets of the data as a function of proximity of sector locations of associated sectors of the set of sectors to the head position. At 718, method 700 can comprise storing the subsets of data to the hard drive in order of proximity of the associated sector locations to the head position.

Figure 8:
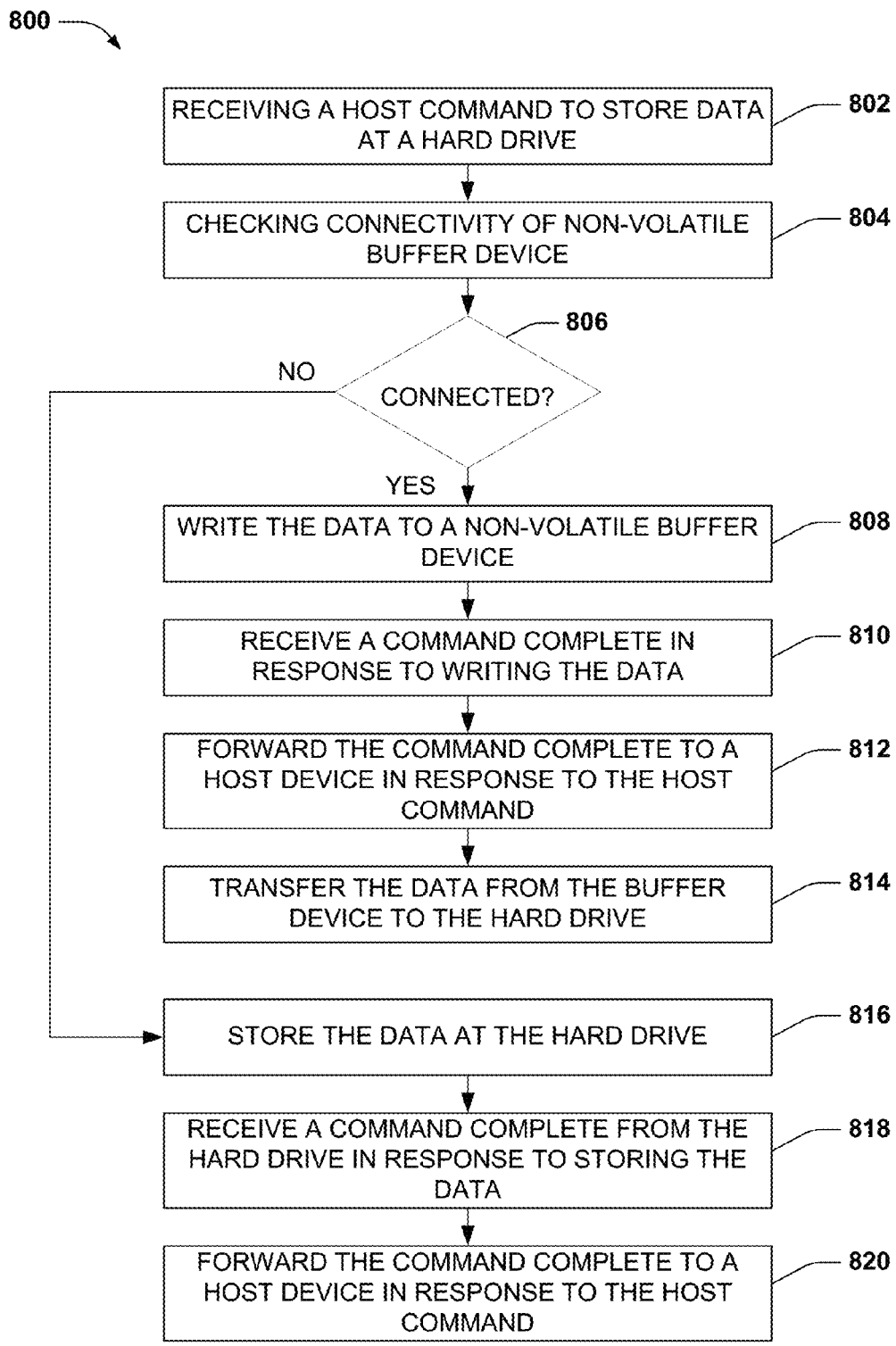
FIG. 8 depicts a flowchart of an example method for operating a storage device with removable caching buffer, in further embodiments.

FIG. 8 depicts a flowchart of an example method 800 for operating a storage device according to further embodiments of the subject disclosure. At 802, method 800 can comprise receiving a host command to store data at a hard drive. At 804, method 800 can comprise checking connectivity of a non-volatile buffer device. At 806, a determination can be made as to whether the non-volatile buffer device is connected. If yes, method 800 can proceed to 808; otherwise, method 800 can proceed to 816.

At 808, method 800 can comprise writing the data to a non-volatile buffer device. At 810, method 800 can comprise receiving a command complete acknowledgment from the non-volatile buffer device, in response to writing the data. At 812, method 800 can comprise forwarding the command complete acknowledgement to a host device in response to the host command. At 814, method 800 can comprise transferring the data from the buffer device to the hard drive.

At 816, method 800 can comprise storing the data at the hard drive. At 818, method 800 can comprise receiving a command complete acknowledgment from the hard drive in response to storing the data. At 820, method 800 can comprise forwarding the command complete acknowledgment to the host device in response to the host command.

Figure 9:
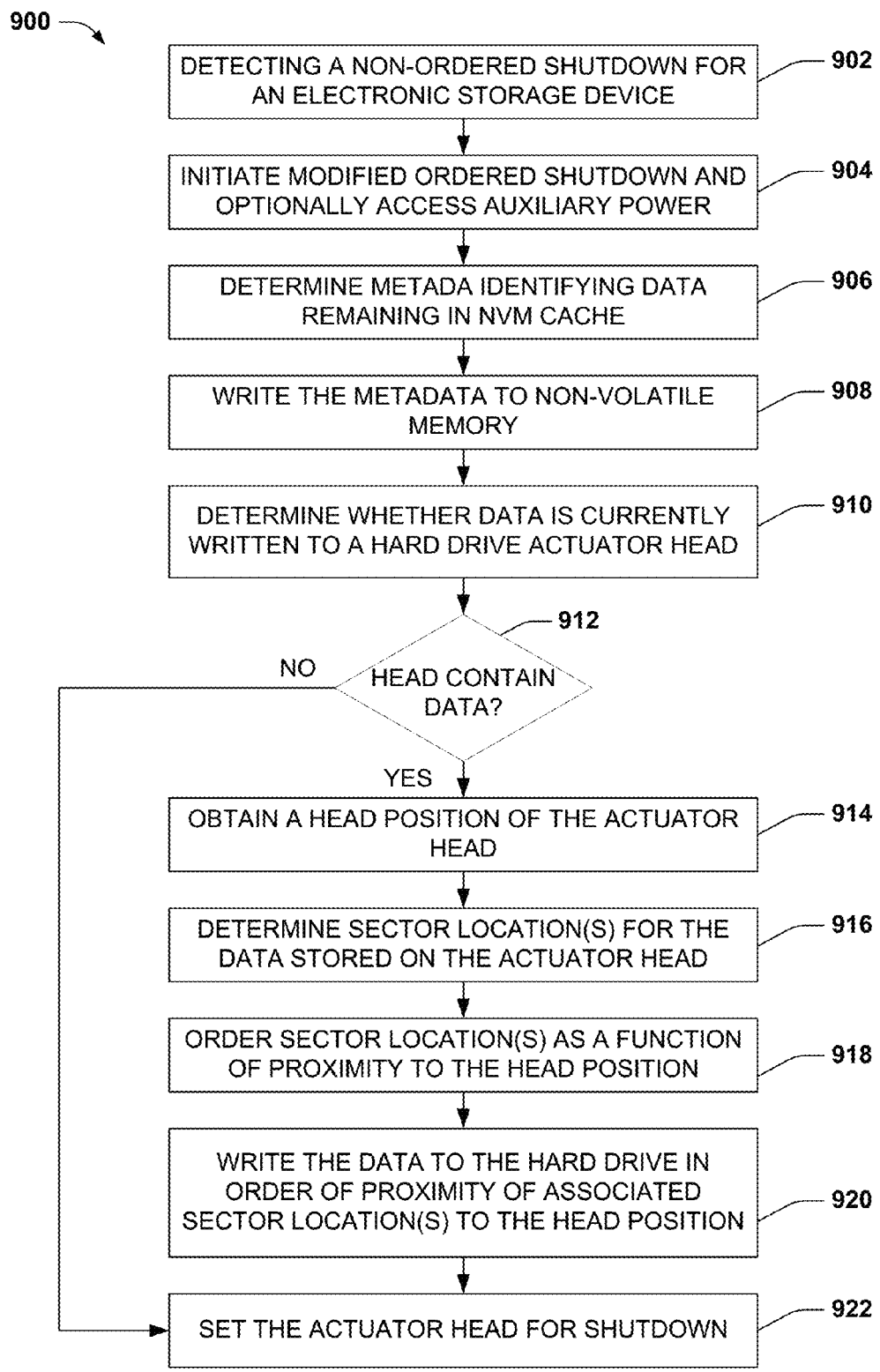
FIG. 9 illustrates a flowchart of a sample method for performing a modified ordered shutdown in response to unexpected power loss, in an embodiment.

FIG. 9 illustrates a flowchart of a sample method 900 according to additional embodiments of the present disclosure. At 902, method 900 can comprise detecting a non-ordered shutdown for a data storage device (e.g., a hard drive device). The non-ordered shutdown can be loss of fixed power supply power, as one example. At 904, method 900 can comprise initiating a modified ordered shutdown procedure in response to detecting the non-ordered shutdown. Initiating the modified ordered shutdown procedure can optionally comprise accessing auxiliary power, in one or more embodiments. At 906, method 900 can comprise determining metadata identifying a subset of data remaining in NVM cache. At 908, method 900 can comprise writing the metadata to non-volatile memory. Such non-volatile memory can comprise NVM cache, or hard drive media. The metadata can record a current state of a host write in response to detecting the non-ordered shutdown, identify locations of data in the NVM cache yet to be written to hard drive media, data from the NVM cache already written to the hard drive media, and so forth.

At 910, method 900 can comprise determining whether data is currently written to a hard drive actuator head of the data storage device. At 912, a decision is made; if no data is written to the hard drive actuator head, method 900 can proceed to 922; otherwise method 900 can proceed to 914. At 914, method 900 can comprise obtaining a head position of the actuator head. At 916, method 900 can comprise determining sector location(s) for the data stored on the actuator head. At 918, method 900 can comprise ordering sector location(s) as a function of proximity to the head position. At 920, method 900 can comprise writing the data to the hard drive in order of proximity of associated sector location(s) to the head position. At 922, method 900 can comprise setting the actuator head for shutdown.

Figure 10:
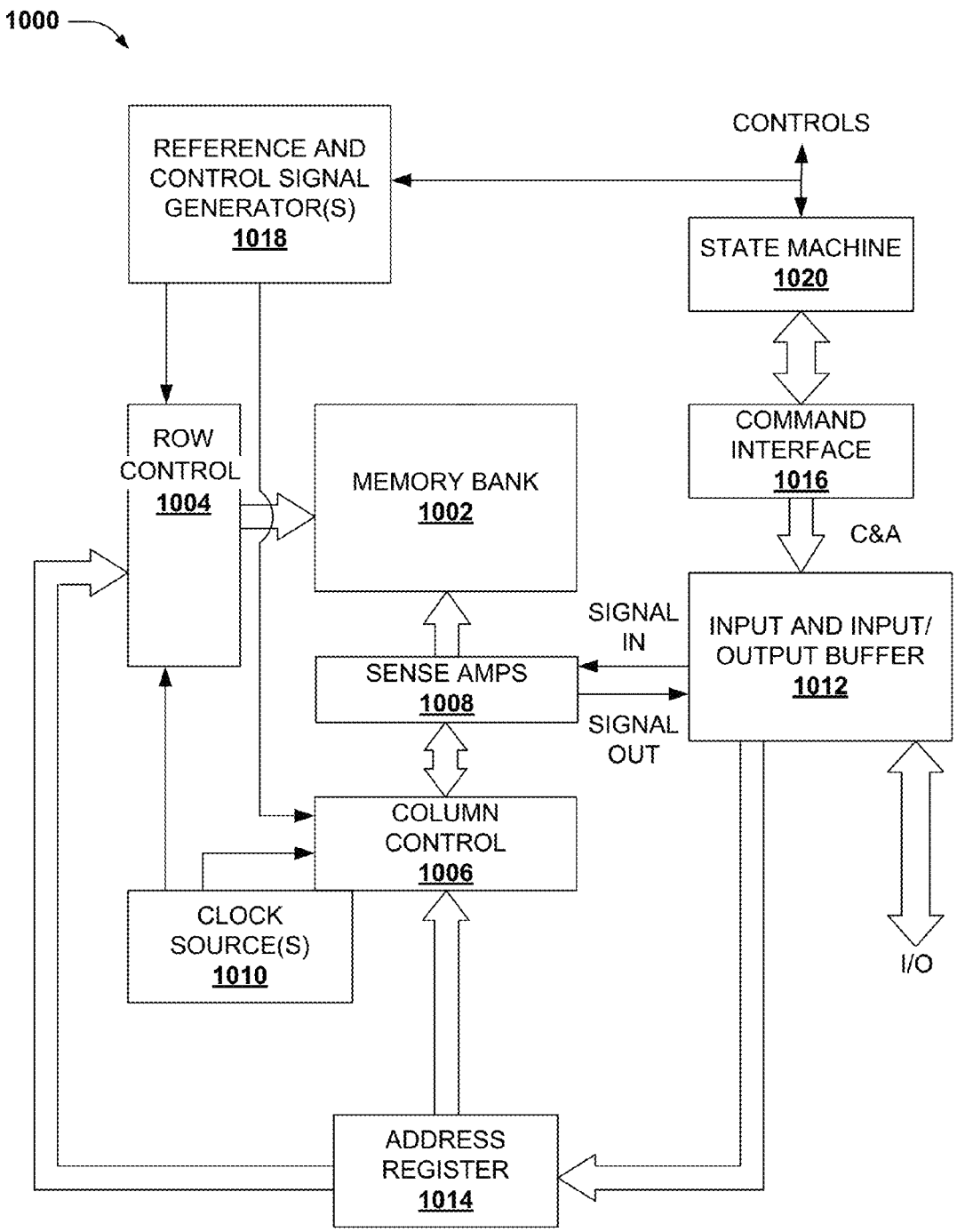
FIG. 10 depicts a block diagram of a sample operating environment for facilitating implementation of one or more aspects disclosed herein.

In order to provide a context for the various aspects of the disclosed subject matter, FIG. 10, as well as the following discussion, is intended to provide a brief, general description of a suitable environment in which various aspects of the disclosed subject matter can be implemented or processed. While the subject matter has been described above in the general context of electronic memory or architectures and process methodologies for operating such memory or architectures, those skilled in the art will recognize that the subject disclosure also can be implemented in combination with other architectures or process methodologies. Moreover, those skilled in the art will appreciate that the disclosed processes can be practiced with a processing system or a computer processor, either alone or in conjunction with a host computer (e.g., computer 1102 of FIG. 11, infra), which can include single-processor or multiprocessor computer systems, mini-computing devices, mainframe computers, server computers, as well as personal computers, hand-held computing devices (e.g., PDA, smart phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject innovation can be practiced on stand-alone electronic devices, such as a memory card, Flash memory module, removable memory, or the like. In a distributed computing environment, program modules can be located in both local and remote memory storage modules or devices.

FIG. 10 illustrates a block diagram of an example operating and control environment 1000 for a memory bank 1002 of a memory device according to aspects of the subject disclosure. In at least one aspect of the subject disclosure, memory bank 1002 can comprise memory selected from a variety of memory cell technologies. In at least one embodiment, memory bank 1002 can comprise a two-terminal memory technology, arranged in a compact two or three dimensional architecture. Suitable two-terminal memory technologies can include resistive-switching memory, conductive-bridging memory, phase-change memory, organic memory, magneto-resistive memory, or the like, or a suitable combination of the foregoing. In an embodiment, memory bank 1002 can be configured to operate according to a first set of configurations (e.g., multi-level cell (MLC), single-level cell (SLC), operation voltage, clock speed, latency, etc.) that is at least in part different from a second set of configurations of a second memory bank of the memory device.

A column controller 1006 and sense amps 1008 can be formed adjacent to memory bank 1002. Moreover, column controller 1006 can be configured to activate (or identify for activation) a subset of bitlines of memory bank 1002. Column controller 1006 can utilize a control signal provided by a reference and control signal generator(s) 1018 to activate, as well as operate upon, respective ones of the subset of bitlines, applying suitable program, erase or read voltages to those bitlines. Non-activated bitlines can be kept at an inhibit voltage (also applied by reference and control signal generator(s) 1018), to mitigate or avoid bit-disturb effects on these non-activated bitlines.

In addition, operating and control environment 1000 can comprise a row controller 1004. Row controller 1004 can be formed adjacent to and electrically connected with word lines of memory bank 1002. Further, utilizing control signals of reference and control signal generator(s) 1018, row controller 1004 can select particular rows of memory cells with a suitable selection voltage. Moreover, row controller 1004 can facilitate program, erase or read operations by applying suitable voltages at selected word lines.

Sense amps 1008 can read data from, or write data to the activated memory cells of memory bank 1002, which are selected by column control 1006 and row control 1004. Data read out from memory bank 1002 can be provided to an input and input/output buffer 1012 (e.g., a NVM buffer, in some embodiments) Likewise, data to be written to memory bank 1002 can be received from the input and input/output buffer 1012 and written to the activated memory cells of memory bank 1002.

A clock source(s) 1010 can provide respective clock pulses to facilitate timing for read, write, and program operations of row controller 1004 and column controller 1006. Clock source(s) 1010 can further facilitate selection of wordlines or bitlines in response to external or internal commands received by operating and control environment 1000. Input and input/output buffer 1012 can comprise a command and address input, as well as a bidirectional data input and output. Instructions are provided over the command and address input, and the data to be written to memory bank 1002 as well as data read from memory bank 1002 is conveyed on the bidirectional data input and output, facilitating connection to an external host apparatus, such as a computer or other processing device (not depicted, but see e.g., computer 1002 of FIG. 10, infra).

Input and input/output buffer 1012 can be configured to receive write data, receive an erase instruction, receive a status or maintenance instruction, output readout data, output status information, and receive address data and command data, as well as address data for respective instructions. Address data can be transferred to row controller 1004 and column controller 1006 by an address register 1010. In addition, input data is transmitted to memory bank 1002 via signal input lines between sense amps 1008 and input and input/output buffer 1012, and output data is received from memory bank 1002 via signal output lines from sense amps 1008 to input and input/output buffer 1012. Input data can be received from the host apparatus, and output data can be delivered to the host apparatus via the I/O bus.

Commands received from the host apparatus can be provided to a command interface 1016. Command interface 1016 can be configured to receive external control signals from the host apparatus, and determine whether data input to the input and input/output buffer 1012 is write data, a command, or an address. Input commands can be transferred to a state machine 1020.

State machine 1020 can be configured to manage programming and reprogramming of memory bank 1002 (as well as other memory banks of a multi-bank memory array). Instructions provided to state machine 1020 are implemented according to control logic configurations, enabling state machine 1020 to manage read, write, erase, data input, data output, and other functionality associated with memory bank 1002. In some aspects, state machine 1020 can send and receive acknowledgments and negative acknowledgments regarding successful receipt or execution of various commands. In further embodiments, state machine 1020 can decode and implement status-related commands, decode and implement configuration commands, and so on.

To implement read, write, erase, input, output, etc., functionality, state machine 1020 can control clock source(s) 1008 or reference and control signal generator(s) 1018. Control of clock source(s) 1008 can cause output pulses configured to facilitate row controller 1004 and column controller 1006 implementing the particular functionality. Output pulses can be transferred to selected bitlines by column controller 1006, for instance, or wordlines by row controller 1004, for instance.

In connection with FIG. 11, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 11:
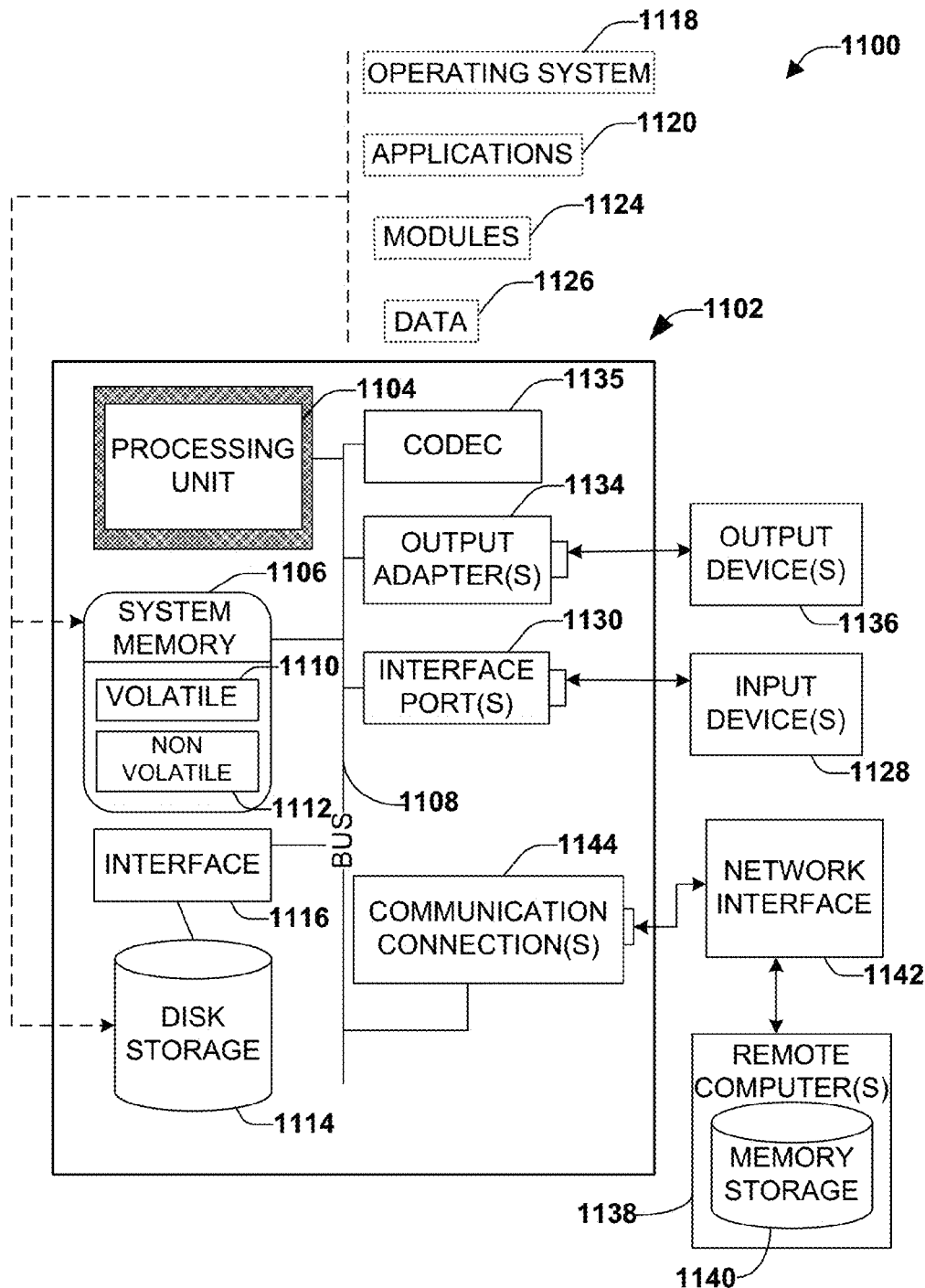
FIG. 11 illustrates a block diagram of an example computing environment that can be implemented in conjunction with various embodiments.

With reference to FIG. 11, a suitable operating environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1114, which can employ one or more of the disclosed memory architectures, in various embodiments. The basic input/output system (BIOS), containing the basic routines to transfer information between elements within the computer 1102, such as during start-up, is stored in non-volatile memory 1112. In addition, according to present innovations, codec 1135 may include at least one of an encoder or decoder, wherein the at least one of an encoder or decoder may consist of hardware, software, or a combination of hardware and software. Although, codec 1135 is depicted as a separate component, codec 1135 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or Flash memory. Non-volatile memory 1112 can employ one or more of the disclosed memory architectures, in at least some disclosed embodiments. Moreover, non-volatile memory 1112 can be computer memory (e.g., physically integrated with computer 1102 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1110 includes random access memory (RAM), which acts as external cache memory, and can also employ one or more disclosed memory architectures in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), and so forth.

Computer 1102 may also include removable/non-removable, volatile/non-volatile computer storage medium. FIG. 11 illustrates, for example, disk storage 1114. Disk storage 1114 includes, but is not limited to, devices such as a magnetic disk drive, solid state disk (SSD) floppy disk drive, tape drive, Jaz drive, Zip drive, LS-100 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to the system bus 1108, a removable or non-removable interface is typically used, such as interface 1116. It is appreciated that disk storage 1114 can store information related to a user. Such information might be stored at or provided to a server or to an application running on a user device. In one embodiment, the user can be notified (e.g., by way of output device(s) 1136) of the types of information that are stored to disk storage 1114 and/or transmitted to the server or application. The user can be provided the opportunity to opt-in or opt-out of having such information collected and/or shared with the server or application (e.g., by way of input from input device(s) 1128).

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102 and to output information from computer 1102 to an output device 1136. Output adapter 1134 is provided to illustrate that there are some output devices, such as monitors, speakers, and printers, among other output devices, which require special adapters. The output adapter 1134 can include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks such as Integrated Services Digital Networks (ISDN) and variations thereon, packet switching networks, and Digital Subscriber Lines (DSL).

Communication connection(s) 1144 refers to the hardware/software employed to connect the network interface 1142 to the system bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, replicating, mimicking, determining, or transmitting, and the like, refer to the action and processes of processing systems, and/or similar consumer or industrial electronic devices or machines, that manipulate or transform data or signals represented as physical (electrical or electronic) quantities within the circuits, registers or memories of the electronic device(s), into other data or signals similarly represented as physical quantities within the machine or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A data storage device, comprising:
   a storage media comprising a magnetic storage disk;
   a caching buffer comprising a non-volatile resistive memory; and
   a controller communicatively coupled to the storage media and to the caching buffer, and comprising a memory for storing instructions related to writing data to the magnetic storage disk by way of the caching buffer, and a processor for implementing the instructions, the controller further comprising:
      a host interface configured to facilitate communication between a host device and the controller;
      a storage media interface configured to store data at the magnetic storage disk; and
      a caching buffer interface configured to facilitate communication between the caching buffer and the controller, wherein the processor is communicatively coupled to the host interface, the storage media interface and the caching buffer interface, and is configured to:
         direct the host interface to receive host data from the host device;
         direct the caching buffer interface to store the host data to the caching buffer;
         direct the host interface to output a write acknowledgment indicator to the host device facilitating de-allocation of host memory reserved by the host device for the host data in response to storing the host data to the caching buffer;
         direct the caching buffer to read the host data stored at the caching buffer; and
         direct the storage media interface to store the host data read from the caching buffer onto the magnetic storage disk after the write acknowledgement indicator is output.

2. The data storage device of claim 1, wherein:
   the caching buffer is configured to generate a write complete prior to being directed to read the host data stored at the caching buffer and provide the write complete over the caching buffer to the controller; and
   the processor is further configured to direct the host interface to output the write acknowledgment indicator to the host device in response to receiving the write complete response from the caching buffer.

3. The data storage device of claim 1, wherein the processor is configured to direct the caching buffer interface to read a first subset of the host data from the caching buffer concurrent with directing the caching buffer interface to write a second subset of the host data to the caching buffer.

4. The data storage device of claim 3, wherein the processor is configured to direct the storage media interface to store the first subset of the host data at the magnetic storage disk concurrent with directing the caching buffer interface to write the second subset of the host data to the caching buffer.

5. The data storage device of claim 1, wherein the magnetic storage disk comprises a platter having multiple sectors for writing data within the platter, and an actuator head having a variable position with respect to the multiple sectors.

6. The data storage device of claim 5, wherein:
   the processor is configured to determine a subset of the sectors to which corresponding subsets of the host data are to be written in conjunction with directing the storage media interface to store the host data from the caching buffer to the magnetic storage disk;
   the storage media interface is configured to output to the processor a current metric of the variable position of the actuator head relative to the multiple sectors; and
   the processor is configured to determine respective locations of the subset of the sectors to the variable position of the actuator head.

7. The electronic apparatus of claim 6, wherein the processor is further configured to compile a list of the subset of the sectors in order of proximity to the current metric of the variable position of the actuator head in response to determining the respective locations of the subset of the sectors to the variable position of the actuator head.

8. The electronic apparatus of claim 7, wherein the processor is further configured to:
   compile a second list of the corresponding subsets of the host data in order of correspondence to respective sectors of the list of the subset of sectors; and
   write the host data from the caching buffer to the magnetic storage disk in order established by the second list.

9. The electronic apparatus of claim 1, wherein the caching buffer interface is a removable interface, and wherein the non-volatile resistive memory is removably connected to or disconnected from the caching buffer interface.

10. The electronic apparatus of claim 9, wherein the processor is configured to detect a connection or a disconnection of the non-volatile resistive memory to the caching buffer interface.

11. The electronic apparatus of claim 10, wherein the processor is configured to receive a second instruction to store second host data at the storage media and, in response to the second instruction and a detection of the disconnection of the non-volatile resistive memory from the caching buffer interface, direct the storage media interface to store the additional host data to the magnetic storage disk.

12. The electronic apparatus of claim 11, wherein the processor is configured to receive a third instruction to store third host data at the storage media and, in response to the third instruction and a detection of the connection of the non-volatile resistive memory to the buffer interface, direct the caching buffer interface to store the third host data to the caching buffer.

13. The electronic apparatus of claim 9, wherein the caching buffer interface is an open NAND Flash interface (ONFI) standard interface, or a double data rate RAM (DDR) standard interface.

14. The electronic apparatus of claim 9, wherein the caching buffer interface is a non-standard interface facilitating hot-swappable interconnection of the non-volatile resistive memory with the controller.

15. The electronic apparatus of claim 1, wherein the non-volatile resistive memory comprises two-terminal, resistive switching memory.

16. A memory controller, comprising:
 a host interface configured to facilitate communication between a host device and the memory controller;
 a hard drive interface configured to facilitate communication between the hard drive and the memory controller;
 a buffer interface configured to facilitate communication between a non-volatile solid state memory device and the memory controller;
 a memory module configured to store instructions related to operations of the memory controller; and
 a processor configured to execute the instructions to facilitate implementing the operations, wherein the instructions comprise:
  receiving a command over the host interface to store data at the hard drive;
  writing the data over the buffer interface to a buffer comprising the non-volatile solid state memory device in response to receiving the command;
  detecting a non-ordered shutdown of the memory controller and processor following receiving the command over the host interface;
  retaining the data written to the buffer comprising the non-volatile solid state memory device within the buffer following detecting the non-ordered shutdown thereby mitigating or avoiding loss of the data;
  replying to the command over the host interface with a command complete acknowledgment in response to writing the data to the buffer.

17. The memory controller of claim 16, wherein the instructions further comprise:
 obtaining a head position of a read-write head of the hard drive; and
 determining sector locations for a set of sectors of the hard drive to which subsets of the data are to be written.

18. The memory controller of claim 17, wherein the instructions further comprise writing the subsets of the data to the hard drive in order of proximity of respective associated sector locations to the head position of the read-write head of the hard drive.

19. The memory controller of claim 16, wherein the instructions further comprise at least one of:
 detecting a disconnection of the non-volatile solid state memory device from the buffer interface, and writing a subset of the data directly to the hard drive in response to detecting the disconnection; or
 detecting a connection of the non-volatile solid state memory device to the buffer interface, and resuming writing of the data to the buffer in response to detecting the connection.

20. The memory controller of claim 16, wherein the instructions further comprise:
 generating metadata in response to the non-ordered shutdown indicative of a portion of the data written to the hard drive and a second portion of the data stored within the buffer remaining to be written to the hard drive; and
 storing the metadata at the buffer.

* * * * *